United States Patent
Goldmann

(10) Patent No.: US 9,969,429 B2
(45) Date of Patent: May 15, 2018

(54) AUTOMATED PARKING PROCESS COMPRISING ADDITIONAL CORRECTION MOVE

(71) Applicant: Bayerische Motoren Werke Aktiengesellschaft, Munich (DE)

(72) Inventor: Thomas Goldmann, Bayreuth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 178 days.

(21) Appl. No.: 14/979,753

(22) Filed: Dec. 28, 2015

(65) Prior Publication Data

US 2016/0107691 A1    Apr. 21, 2016

Related U.S. Application Data

(63) Continuation of application No. PCT/EP2014/063363, filed on Jun. 25, 2014.

(30) Foreign Application Priority Data

Jun. 26, 2013  (DE) ........................ 10 2013 212 318

(51) Int. Cl.
  G06F 19/00   (2011.01)
  B62D 15/02   (2006.01)

(52) U.S. Cl.
  CPC ................ B62D 15/0285 (2013.01)

(58) Field of Classification Search
  CPC ........ B25J 13/085; B25J 9/1674; B25J 19/06; G05B 2219/40201; G05B 2219/40202

(Continued)

(56) References Cited

U.S. PATENT DOCUMENTS

| 2010/0033348 | A1* | 2/2010 | Kawabata | ................ B60R 1/00 340/932.2 |
| 2013/0166190 | A1 | 6/2013 | Ikeda et al. | |
| 2015/0166062 | A1* | 6/2015 | Johnson | ................ B60W 30/12 701/41 |

FOREIGN PATENT DOCUMENTS

| CN | 102529961 A | 7/2012 |
| CN | 103079903 A | 5/2013 |

(Continued)

OTHER PUBLICATIONS

Chinese Office Action issued in counterpart Chinese Application No. 201480046325.1 dated Dec. 23, 2016 with English-language translation (twenty (20) pages).

(Continued)

*Primary Examiner* — Ronnie Mancho
(74) *Attorney, Agent, or Firm* — Crowell & Moring LLP

(57) ABSTRACT

A method performs an automated process for parking a motor vehicle in a longitudinal parking space, wherein the vehicle automatically controls the longitudinal and transverse movement of the vehicle and the vehicle is moved, in one or more moves, into a position in the longitudinal parking space in which the vehicle is aligned in the longitudinal direction substantially parallel to a lateral delimitation line of the longitudinal parking space and is at a permissible distance from the lateral delimitation line of the longitudinal parking space. The method is characterized in that the distance from a front delimiting object of the parking space is determined in the aligned position and, depending on the distance, the vehicle performs an additional correction move, in which the vehicle is moved in the forward or reverse direction under automatic control with a steering angle of substantially zero degrees.

14 Claims, 2 Drawing Sheets

(58) Field of Classification Search
USPC .................................................... 701/1, 41
See application file for complete search history.

(56) References Cited

FOREIGN PATENT DOCUMENTS

| | | |
|---|---|---|
| DE | 10 2004 047 483 A1 | 4/2006 |
| DE | 10 2008 020 561 A1 | 10/2009 |
| DE | 10 2009 025 328 A1 | 12/2010 |
| DE | 10 2009 057 647 A1 | 6/2011 |
| DE | 10 2011 084 479 A1 | 4/2013 |
| EP | 1 533 181 A2 | 5/2005 |
| EP | 1 690 777 A1 | 8/2006 |
| EP | 2 090 498 A2 | 8/2009 |
| EP | 2 444 302 A2 | 4/2012 |
| EP | 2 471 696 A2 | 7/2012 |
| GB | 2473551 A | 3/2011 |
| WO | WO 2006/050710 A1 | 5/2006 |

OTHER PUBLICATIONS

International Search Report (PCT/ISA/210) issued in PCT Application No. PCT/EP2014/063363 dated Oct. 9, 2014 with English-language translation (six (6) pages).
German Office Action issued in counterpart German Application No. 10 2013 212 318.3 dated Feb. 26, 2014 (four (4) pages).
D. Ahrens, "Parking assistant with longitudinal and transverse guidance," 5th Driver Assistance Conference of TU Muenchen, Munich (2012), pp. 1-10.

\* cited by examiner

AUTOMATED PARKING PROCESS COMPRISING ADDITIONAL CORRECTION MOVE

CROSS REFERENCE TO RELATED APPLICATIONS

This application is a continuation of PCT International Application No. PCT/EP2014/063363, filed Jun. 25, 2014, which claims priority under 35 U.S.C. § 119 from German Patent Application No. 10 2013 212 318.3, filed Jun. 26, 2013, the entire disclosures of which are herein expressly incorporated by reference.

BACKGROUND AND SUMMARY OF THE INVENTION

The invention relates to a method and a corresponding parking assistance system for performing an automated parking process for a motor vehicle in a parallel parking space arranged parallel to the direction of the road, wherein the vehicle controls the longitudinal and tranverse movement of the vehicle automatically.

In parking assistance systems with automated tranverse guidance, i.e. with automatic control of the transverse movement of the vehicle, the steering of the vehicle during the parking process into a parallel parking space is undertaken by the parking assistance system. The longitudinal guidance must be undertaken by the driver himself by means of appropriate acceleration and braking. In parking assistance systems with automated transverse and longitudinal guidance, this task of longitudinal guidance is also undertaken by the parking assistance system; the vehicle controls the longitudinal and transverse movement of the vehicle automatically. In such parking assistance systems with automated transverse and longitudinal guidance, the driver generally has the option of being able to have the vehicle parked and optionally taken out of the parking space automatically at the touch of a button.

An exemplary parking assistance system with automated tranverse and longitudinal guidance is described in the document "Parking assistant with longitudinal and transverse guidance", Dirk Ahrens, $5^{th}$ Driver Assistance Conference of TU München, Münich, 2012.

A further parking assistance system with automated transverse and longitudinal guidance is described in the document WO 2006/050710.

In established parking assistance systems with automated transverse and longitudinal guidance, the vehicle is moved in one or more moves into a final parking position in the parallel parking space in which the vehicle is oriented substantially parallel to a lateral boundary line of the parallel parking space in the longitudinal direction and is at an admissible distance from the lateral boundary line of the parallel parking space. The lateral boundary line is formed by the curb, for example.

A disadvantage of this is that the parking process is completed independently of the longitudinal orientation of the vehicle in the parallel parking space; only the distance from the lateral boundary line (i.e. typically the distance from the curb) and the vehicle skew (i.e. whether the vehicle is oriented parallel to the lateral boundary line) are rated.

Since the longitudinal orientation of the vehicle in the parking space is not taken into account when the parking process is completed, an unnecessarily large amount of parking space is wasted. If, when the vehicle is parked in a large parking space, for example, the vehicle comes to a standstill in the middle of the parking space as the final parking position, parking space in front of and behind the vehicle is wasted unnecessarily.

Furthermore, it may be difficult for the driver to take the vehicle out of the parking space manually later if, in the final parking position, the distance between the front of the vehicle and the rear of the bounding vehicle parked in front is short.

It is an object of the invention to provide a method for performing an automated parking process with automated transverse and longitudinal guidance that is improved in respect of these disadvantages, as well as to provide a corresponding parking assistance system.

This and other objects are achieved in a first aspect of the invention by a method for performing an automated parking process for a motor vehicle in a parallel parking space, wherein the vehicle controls the longitudinal and transverse movement of the vehicle automatically, which involves the vehicle being moved in one or more moves into an oriented position in the parallel parking space in which the vehicle is oriented substantially parallel to a lateral boundary line of the parallel parking space in the longitudinal direction and is at an admissible distance from the lateral boundary line of the parallel parking space. This oriented position corresponds to the final parking position in conventional parking assistance systems with automated transverse and longitudinal guidance.

The method according to the first aspect of the invention is distinguished in that the distance from a bounding object at the front (frequently: bounding vehicle at the front) of the parking space is determined in the oriented position (in which the vehicle is preferably at a standstill) and then, on the basis of the distance, the vehicle performs an additional corrective move in which the vehicle moves in the forward direction or the reverse direction under automatic control with a steering angle of substantially zero degrees. A steering angle of substantially zero degrees means that the vehicle moves in the forward direction or the reverse direction in the longitudinal direction of the vehicle.

The proposed additional corrective move allows the attainment of an optimum longitudinal orientation in the parking space. This allows the parking space requirement to be kept small and, furthermore, it is possible to attain a distance from the bounding vehicle at the front that facilitates taking the vehicle out of the parking space later since the parking process is not completed too close to the bounding object at the front.

Advantageously, in an additional corrective move with a steering angle of zero degrees, the distance of the vehicle is corrected to a prescribed target distance from the bounding object at the front (frequently bounding vehicle at the front). By way of example, the prescribed target distance corresponds to a value in the range from 50 cm to 110 cm, particularly in the range from 70 cm to 90 cm, for example 80 cm. When the distance from the bounding object at the front is corrected to a prescribed target distance in the range from 70 cm to 90 cm, the available parking space is utilized well and at the same time an adequate distance from the bounding object at the front is left, so that it is a simple matter to take the vehicle out of the parking space later in one move (i.e. without reversing the vehicle).

The distance can be corrected depending on the distance from the bounding object at the front either by maneuvering forward or by maneuvering backward with a steering angle of zero degrees. In the first case, the vehicle moves up to a prescribed target distance from the bounding object at the front.

In the oriented position, according to an advantageous embodiment, a check is performed to determine whether the distance from the bounding object at the front is greater than (or, in an alternative embodiment: greater than or equal to) a first threshold value (for example 1.1 m); in this case (subsequently called case 1), the vehicle is too far away from the bounding object at the front. In this case 1, the vehicle automatically heads toward the bounding object at the front in the forward direction with automated transverse and longitudinal guidance as part of the corrective move and, in so doing, reduces the distance from the bounding object at the front.

If, by contrast, the distance from the bounding object at the front is less than or, in an alternative embodiment, less than or equal to a prescribed third threshold value (for example 0.5 m) and the vehicle is therefore too close to the bounding object at the front, then in this case (subsequently called case 2) the vehicle automatically heads away from the bounding object at the front in the reverse direction with automated transverse and longitudinal guidance as part of the corrective move.

In this case, the third threshold value (for example 0.5 m) is preferably less than the first threshold value (for example 1.1 m), which means that an intermediate range is obtained between the first and third threshold values. Alternatively, it would be conceivable for the third threshold value to correspond to the first threshold value.

Preferably, if case 1 is present and the distance from the bounding object at the front is greater than or greater than or equal to the first threshold value in the oriented position, then the vehicle is headed in the forward direction toward the bounding object at the front as part of the corrective move until the distance from the bounding object at the front reaches a second threshold value (e.g. 0.9 m), provided that at this moment the distance from the bounding object at the rear meets a particular condition at the same time. In this case, the second threshold value (e.g. 0.9 m) is less than the first threshold value (e.g. 1.1 m), since the vehicle is moving in the forward direction toward the bounding object at the front. When this second threshold value is reached and the condition in relation to the distance from the bounding object at the rear is met, the heading toward the bounding object at the front is completed; in that case, by way of example, the drive torque is reduced to zero or to a negative value and a braking torque is set by way of the service brake in order to stop the vehicle; preferably the vehicle does not come to a standstill immediately, however, but rather, owing to the inertia of the vehicle, will still move a certain distance $\Delta s$ in the forward direction, for example approximately 10 cm, after the second threshold value is reached. In this case, a final distance (e.g. 0.8 m) from the bounding vehicle at the front would be obtained that corresponds to the second threshold value reduced by $\Delta s$. Alternatively, it would also be conceivable for the vehicle to head toward the second threshold value for the distance from the bounding vehicle at the front at a speed steadily decreasing to zero, so that the vehicle comes to a standstill at the same time as the second threshold value is reached.

As a condition in relation to the distance from the bounding object at the rear, it is possible to check, by way of example, whether (when the second threshold value is reached by the distance from the bounding object at the front) the current distance from the bounding object at the rear is substantially greater than or greater than or equal to the current distance from the bounding object at the front. In this case, it is possible to take account of an optional tolerance, so that a check is then performed to determine whether the distance from the bounding object at the rear plus the tolerance (for example a tolerance of 0.1 m) is greater than or greater than or equal to the current distance from the bounding object at the front. In this case, when the second threshold value is reached, the vehicle will then complete the heading toward the bounding object at the front; otherwise, the vehicle will continue to head toward the bounding object at the front. After the distance from the bounding object at the front has dropped below the second threshold value, the vehicle will continue to head toward the bounding object at the front in the forward direction, until the distance from the bounding object at the front substantially (i.e. for example optionally taking into account a tolerance of 10 cm, for example) corresponds to the distance from the bounding object at the rear; the heading toward the bounding object at the front is then completed. In this case, the vehicle is thus oriented substantially centrally in the parallel parking space in the longitudinal direction.

Preferably, if case 2 applies and the distance from the bounding object at the front is less than or less than or equal to the third threshold value in the oriented position, then the vehicle will head away from the bounding object at the front in the reverse direction as part of the corrective move until the distance from the bounding object at the front reaches a fourth threshold value (e.g. 0.7 m). In this case, the fourth threshold value (e.g. 0.7 m) is greater than the third threshold value (e.g. 0.5 m), since the vehicle is moving away from the bounding object at the front in the reverse direction. When this fourth threshold value is reached, the heading away from the bounding object at the front is completed; however, the vehicle preferably does not come to a standstill immediately, but rather, owing to the inertia of the vehicle, will still move a certain distance $\Delta s$ in the reverse direction, for example approximately 10 cm, after the fourth threshold value is reached.

The fourth threshold value is preferably less than the second threshold value by $2 \cdot \Delta s$. In this case, in case 1, when heading toward the bounding object at the front is completed when the second threshold value (e.g. 0.9 m) is reached, and in case 2, when heading away from the bounding object at the front is completed when the fourth threshold value (e.g. 0.7 m) is reached, the vehicle comes to a standstill approximately at the same final distance (e.g. 0.8 m when $\Delta s=10$ cm) from the bounding object at the front.

For small parking spaces, heading away from the bounding vehicle at the front in the reverse direction does not have to be completed only when the fourth threshold value is reached, however; instead, in small parking spaces, the vehicle can complete the heading away from the bounding object at the front earlier, namely when the distance from the bounding object at the rear becomes substantially (i.e. optionally taking into account a tolerance) less than the distance from the bounding object at the front, for example. In this case, the vehicle is thus oriented substantially centrally in the parallel parking space in the longitudinal direction.

Preferably, the third threshold value (for example 0.5 m) for the heading away from the bounding object at the front in the reverse direction is less than the first threshold value (for example 1.1 m) for the heading toward the bounding object at the front in the forward direction, which means that an intermediate range is obtained between the first and the second threshold values.

Preferably, if the distance from the bounding object at the front is less than or equal to or less than the prescribed first threshold value (e.g. 1.1 m) (i.e. case 1 is not present), and additionally the distance from the bounding object at the front is greater than or equal to or greater than or equal to the third threshold value (0.5 m) (i.e. case 2 is not present), then fundamentally no corrective move is performed, in order to avoid a brief start in the forward direction or the reverse direction.

Optionally, the nonperformance of a corrective move as an additional cumulative condition may alternatively be dependent on the distance from the bounding object at the rear in the oriented position. By way of example, in the oriented position, it is possible to perform a check to determine whether the distance from the bounding object at the rear is greater than or greater than or equal to a fifth threshold value (e.g. 0.4 m; the fifth threshold value is preferably less than the third threshold value) and performance of the corrective move can be prevented if case 1 and case 2 are not present and this cumulative condition (this case is subsequently referred to as case 4) is present. If, by contrast, the vehicle is close to the bounding object at the rear and hence the distance from the bounding object at the rear is less than or equal to or less than the fifth threshold value and case 1 and case 2 are not present (this case is subsequently referred to as case 3), the vehicle is headed away from the bounding object at the rear in the forward direction as part of the corrective move, until the distance from the bounding object at the rear substantially corresponds to or is greater than the distance from the bounding object at the front. In case 3, a small parking space is typically present in which a desired final distance of, by way of example, 0.8 m from the bounding object at the front cannot be achieved without the ego vehicle reaching its final parking position very close to the bounding object at the rear; in this case, the vehicle is oriented substantially centrally in the parallel parking space in the longitudinal direction.

A second aspect of the invention relates to a parking assistance system for performing an automated parking process for a motor vehicle in a parallel parking space. The parking assistance system includes transverse guidance device for automatically controlling the transverse movement of the vehicle and a longitudinal guidance device for automatically controlling the longitudinal movement of the vehicle. The transverse guidance device and longitudinal guidance device may be located in different controllers that communicate with one another via a vehicle bus; they may also be integrated in one controller, however. The parking assistance system is set up to move the vehicle in one or more moves into a position in the parallel parking space in which the vehicle is oriented substantially parallel to a lateral boundary line of the parallel parking space in the longitudinal direction and is at an admissible distance from the lateral boundary line of the parallel parking space. In addition, the parking assistance system is set up to determine the distance from a bounding object at the front of the parking space in this oriented position and, on the basis of the distance, to have the vehicle perform an additional corrective move in which the vehicle moves in the forward direction or the reverse direction under automatic control with a steering angle of substantially zero degrees.

The above explanations regarding the method according to the invention based on the first aspect of the invention also apply in corresponding fashion to the parking assistance system according to the invention based on the second aspect of the invention. Advantageous exemplary embodiments of the parking assistance system according to the invention that have not been explicitly described at this juncture correspond to the advantageous exemplary embodiments of the method according to the invention that are described.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
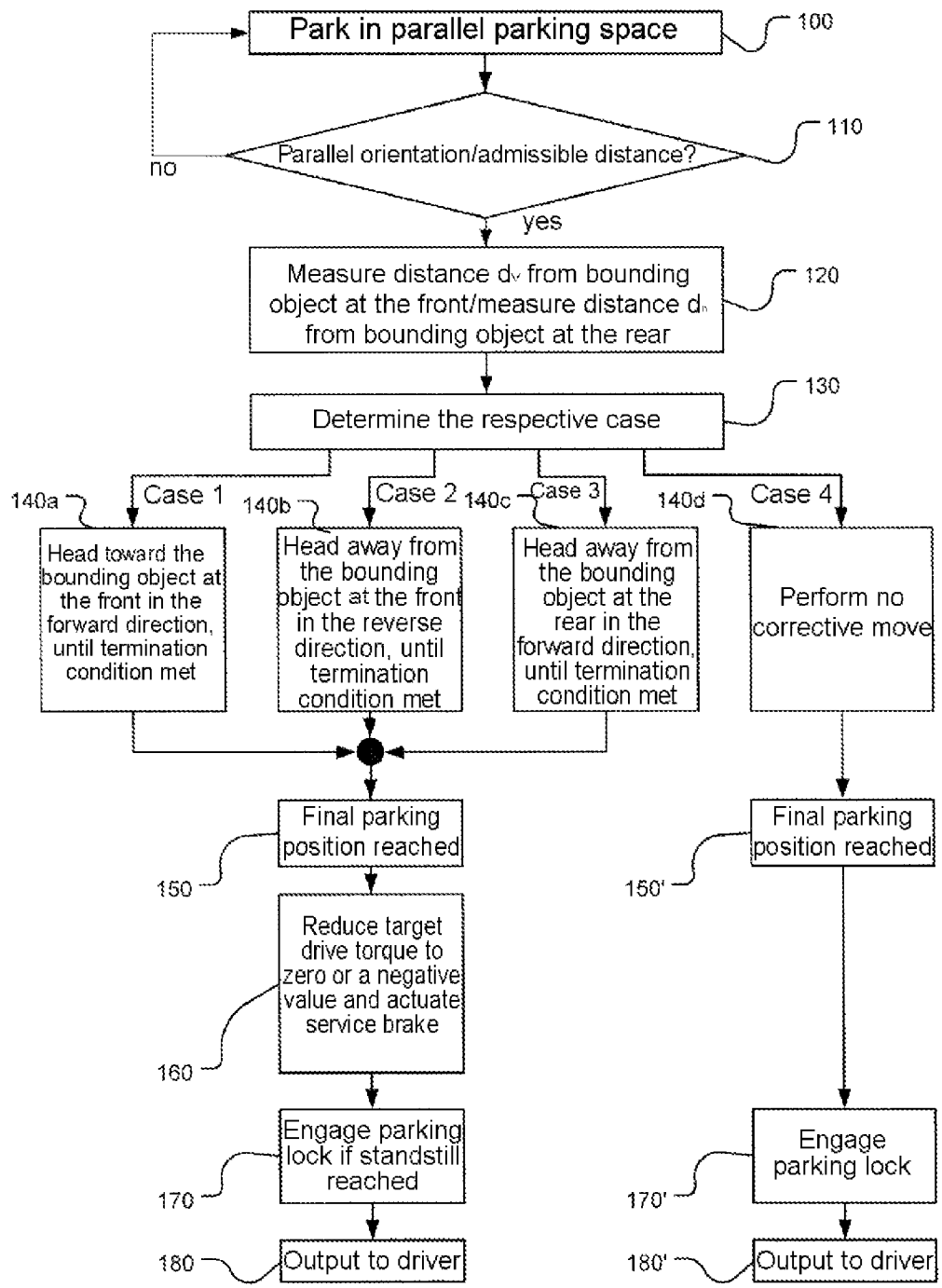
FIG. 1 is a flow chart illustrating an exemplary embodiment of the method according to the invention.
Figure 2:
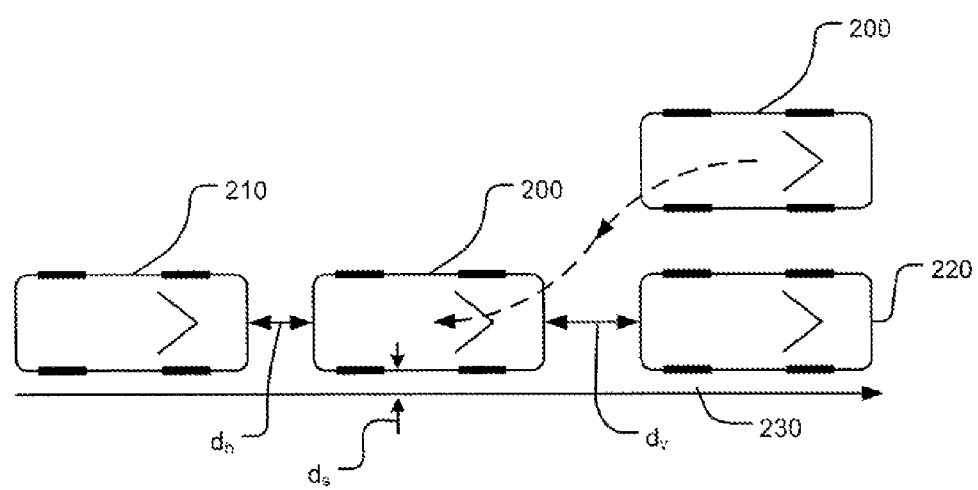
FIG. 2 is a plan view of a typical parking situation in a parallel parking space.

FIG. 1 shows an exemplary embodiment of the method according to the invention for performing an automated parking process for a motor vehicle in a parallel parking space. In this case, a parking assistance system with automated transverse and longitudinal guidance is used. FIG. 2 shows a plan view of the parking process.

An exemplary parking assistance system with automated transverse and longitudinal guidance is described in the document "Parking assistant with longitudinal and transverse guidance", Dirk Ahrens, $5^{th}$ Driver Assistance Conference of TU München, Münich, 2012. The transverse guidance is effected by use of a first controller and the longitudinal guidance is effected by use of a second controller, which communicate with one another via a vehicle bus. The disclosure content of this document regarding the basic operation of this parking assistance system with automated transverse and longitudinal guidance is hereby incorporated by reference herein.

As a vehicle 200 is manually driven past parked vehicles 210, 220, a lateral sensor system finds a suitable parking space and displays it visually to the driver in a display in the vehicle. The driver then acknowledges the parking space found. If the driver is located in a valid starting corridor next to the bounding object at the front 220, from which there is a possible trajectory of travel into a valid final parking position, then the parking maneuver is enabled by actuating an operator control element. Following actuation of the operator control element, the vehicle 200 automatically parks in the parallel parking space in one or more moves (see step 100 in FIG. 1). The dashed line in FIG. 2 corresponds to the trajectory of travel during the parking process.

According to step 110, the vehicle 200 checks whether the vehicle 200 is oriented substantially parallel to a lateral boundary line 230 of the parallel parking space in the longitudinal direction and is at an admissible distance from the lateral boundary line. By way of example, as in FIG. 2, the lateral boundary line 230 is formed by the curb or alternatively by the right hand side of the bounding vehicle 220 at the front. By way of example, the distance $d_S$ from a curb as the lateral boundary line 230 is admissible if it is in a prescribed range, for example in the range from 10 to 60 cm. During the check in step 110, the vehicle is preferably still in motion and comes to a standstill only a short distance later (for example 10 cm later). At a standstill, the vehicle is then oriented substantially parallel to a lateral boundary line 230 of the parallel parking space in the longitudinal direction and is at an admissible distance from the lateral boundary line.

Shortly before the check in step 110 or before the oriented standstill position is reached, a target steering angle of 0° is prescribed, but this is frequently not yet reached by the time the vehicle is at a standstill, which means that the actual steering angle at standstill frequently has a small discrepancy from 0°.

If the oriented standstill position has been reached after the vehicle 200 has stopped, a sensor system of the vehicle 200 (for example an ultrasonic sensor system at the front and at the rear of the vehicle) determines the distance $d_V$ from the bounding object at the front 220 and the distance $d_h$, from the bounding object at the rear 210 in step 120. In the example of FIG. 2, the bounding objects 210, 220 are vehicles, but alternatively another bounding object at the front or rear may be present.

In step 130, the distance $d_V$ from the bounding object 220 at the front and the distance $d_h$ from the bounding object 210 at the rear are taken as a basis for establishing which of cases 1-4 is present. In cases 1 to 3, a corrective move with a steering angle of 0° is performed in order to orient the vehicle in the longitudinal direction. In case 4, no corrective move is performed.

In case 1, the distance $d_V$ from the bounding object 220 at the front is greater than a threshold value $S_1$, which in this case corresponds to the value $S_1=1.1$ m, for example, i.e.

$$d_V > S_1 = 1.1 m. \quad \text{Case 1:}$$

In case 2, the distance $d_V$ from the bounding object 220 at the front is less than a threshold value $S_3$, which in this case corresponds to the value $S_3=0.5$ m, for example, i.e.

$$d_V < S_3 = 0.5 m. \quad \text{Case 2:}$$

In case 3, the distance $d_V$ from the bounding object 220 at the front is less than or equal to the threshold value $S_1$ and greater than or equal to the threshold value $S_3$, while the distance $d_h$ from the bounding object 230 at the rear is less than a threshold value $S_5$, which in this case corresponds to the value $S_5=0.4$ m, for example, i.e.

$$d_V \leq S_1 = 1.1 m \wedge d_V \geq S_3 = 0.5 m \wedge d_h < S_5 = 0.4 m. \quad \text{Case 3:}$$

In case 4, the distance $d_V$ from the bounding object 220 at the front is less than or equal to the threshold value $S_1$ and greater than or equal to the threshold value $S_3$, while the distance $d_h$ from the bounding object 230 at the rear is greater than or equal to the threshold value $S_5$, i.e.

$$d_V \leq S_2 = 1.1 m \wedge d_V \geq S_3 = 0.5 m \wedge d_h \geq S_5 = 0.4 m. \quad \text{Case 4:}$$

In case 1, there is a very great distance $d_V$ from the bounding object 220 at the front and parking space is wasted unnecessarily. In case 1, in step 140a, the vehicle 200 travels toward the bounding object 220 at the front in the forward direction with a steering angle of 0° in a single corrective move until a termination condition is met. The target steering angle is exactly 0° during the whole forward movement; at the beginning of the forward movement, the actual steering angle is possibly still slightly different than 0°, however, and is completely oriented to the target steering angle of 0° only in the initial range of the corrective move. To check the termination condition, the current distance from the bounding object 220 at the front and the current distance from the bounding object 210 at the rear are determined continually during the movement.

A first termination condition for case 1 exists when the current distance $d_V$ from the bounding vehicle at the front has reached a threshold value $S_2$, which in this case is chosen to be $S_2=0.9$ m, and at the same time the current distance $d_h$, from the bounding vehicle 210 at the rear plus a tolerance value T is greater than the current distance $d_V$ from the bounding object 220 at the front (in this case T=0.1 m; the tolerance value generally corresponds to the distance Δs, discussed below, that is still covered owing to vehicle inertia before standstill is reached), i.e.

$$d_V = S_2 = 0.9 m \wedge d_h + T > d_v$$

In this case, the heading toward the bounding object at the front is completed and the state of the final parking position is reached (see step 150). Provided that the state of the final parking position has been reached, the target drive torque is reduced to zero or, by way of example, to a negative value and the service brake is actuated for the purpose of stopping the vehicle (see step 160). The vehicle will still move a certain distance Δs in the forward direction, for example approximately 10 cm, after reaching the state of the final parking position owing to inertia, and will then come to a standstill at a distance $d_V = S_2 - \Delta s = 0.8$ m from the bounding object at the front. When standstill has been reached, the parking lock is switched on (see step 170) and a visual output to the driver is triggered (see step 180) that signals completion of the parking process.

If, in the case of a smaller parking space, the first termination condition is not met at a distance $d_V=0.9$ m, since at this time $d_h+T \leq d_V$ is true (i.e. the distance $d_h$ from the bounding object 210 at the rear plus the tolerance value T is less than or equal to the distance $d_V$ from the bounding object 220 at the front), then a second termination condition for case 1 is met later (i.e. when $d_V$ has dropped below the threshold value $S_2=0.9$ m); this second termination condition is as follows:

$$d_V < S_2 = 0.9 m \wedge d_h + T = d_v$$

If the distance $d_V$ from the bounding object 220 at the front has thus dropped below the threshold value $S_2$ and the distance $d_h$ from the bounding object 210 at the rear plus the tolerance value T corresponds to the distance $d_V$ from the bounding object 220 at the front, the heading toward the heading toward the bounding object 220 at the front is completed, and steps 150 to 180 described above are performed. The second termination condition for case 1 is typically met when the parking space has a short length. The vehicle then comes to a standstill substantially centrally in the parking space.

In case 2, after the oriented standstill position has been reached, there is a short distance $d_V$ from the bounding object 220 at the front ($d_V < S_3 = 0.5$ m). In order to ensure that it is easy to take the vehicle out of the parking space, in case 2 the vehicle 200 travels away from the bounding object 220 at the front in the reverse direction with a steering angle of in a single corrective move in step 140b, until a termination condition is met. Upon travel away from the bounding vehicle 220 at the front, the distance $d_V$ from the bounding object 220 at the front increases. To check the termination condition, the current distance $d_V$ from the bounding object 220 at the front and the current distance $d_h$ from the bounding object 210 at the rear are determined continually during the movement.

A first termination condition for case 2 is met when the current distance $d_h$ from the bounding vehicle 210 at the rear minus the tolerance value T is less than the distance $d_V$ from the bounding object 220 at the front, provided that the distance $d_V$ from the bounding object at the front is less than a threshold value $S_4$, which in this case is chosen to be $S_4=0.7$ m, for example, i.e.

$$d_V < S_4 = 0.7 m \wedge d_h - T < d_v$$

Since the vehicle moves backward in case 2, the distance $d_h$ is still shortened by a short distance $\Delta s$ after the first termination condition is reached. Since the tolerance value T is subtracted from the distance $d_h$, the termination condition is triggered earlier.

This first termination condition for case 2 is typically met in smaller parking spaces when there is insufficient distance on the bounding object 210 at the rear. When the first termination condition for case 2 is met, the heading away from the bounding object 220 at the front is completed, and steps 150 to 180 described above are performed. The first termination condition for case 2 is typically met when the parking space has a short length. The vehicle then comes to a standstill substantially centrally in the parking space.

If the first termination condition for case 2 is not met in the case of a larger parking space, a second termination condition for case 2 is met; this second termination condition is as follows:

$$d_V = S_4 = 0.7m.$$

Thus, if the distance $d_V$ from the bounding vehicle at the front has risen to the threshold value $S_4 = 0.7$ m, the heading away from the bounding vehicle 220 at the front is completed, and the vehicle 200 comes to a standstill after approximately a distance $\Delta s = 0.1$ m, so that approximately a final distance $d_V$ from the bounding object 220 at the front of $d_V = S_4 + 0.1$ m $= 0.8$ m is obtained.

In case 3 the distance $d_V$ from the bounding vehicle 220 at the front is less than in case 1 and greater than in case 2, and at the same time the vehicle 200 is close to the bounding object 210 at the rear. The vehicle is then headed away from the bounding object at the rear in the forward direction according to step 140c, until a termination condition is met.

In this case, the termination condition is met when the distance $d_h$ from the bounding object 210 at the rear plus the tolerance value T is greater than the distance $d_V$ from the bounding object 220 at the front, i.e.

$$d_h + T > d_V$$

If in case 4 the distance $d_V$ from the bounding object 220 at the front is greater than or equal to $S_3 = 0.5$ m and less than or equal to $S_1 = 1.1$ m, but in contrast to case 3 the distance $d_h$ from the bounding object at the rear is greater than or equal to the threshold value $S_5$ (i.e. the vehicle 200 is not as close to the bounding object 210 at the rear as in case 3), then no corrective move is performed (see 140d in FIG. 2), in order to avoid an excessively brief start. It is then established that the final parking position has been reached (see step 150' in FIG. 1) and, on that basis, the parking lock is engaged (see step 170') and an output to the driver is triggered (see step 180') to the effect that the parking process has been concluded.

The method shown in FIG. 1 may also optionally have provision for a corrective move to be triggered (see steps 140a to 140c) only if a prescribed maximum number of moves has not already been reached when the oriented standstill position is reached.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for performing an automated parking process for a motor vehicle in a parallel parking space, wherein longitudinal and transverse movement of the vehicle is controlled automatically to move the vehicle in one or more moves into an oriented position in the parallel parking space in which the vehicle is oriented substantially parallel to a lateral boundary line of the parallel parking space in the longitudinal direction and is at an admissible distance from the lateral boundary line of the parallel parking space, the method comprising the acts of:

determining, when the vehicle is in the oriented position, a distance (dv) from the vehicle to a bounding object at the front of the parking space; and based on the determined distance (dv), performing an additional corrective move of the vehicle in which the vehicle moves in the forward direction or the reverse direction under automatic control, wherein the additional corrective move corrects the distance (dv) of the vehicle to a prescribed target distance from the bounding object at the front.

2. The method according to claim 1, wherein as part of the additional corrective move the distance (dv) of the vehicle is corrected to a prescribed final distance from the bounding object at the front.

3. The method according to claim 1, wherein the distance (dv) from the bounding object at the front is taken as a basis for deciding whether the vehicle is headed toward the bounding object at the front or is headed away from the bounding object at the front in the additional corrective move.

4. The method according to claim 2, wherein the distance (dv) from the bounding object at the front is taken as a basis for deciding whether the vehicle is headed toward the bounding object at the front or is headed away from the bounding object at the front in the additional corrective move.

5. The method according to claim 1, wherein in the oriented position, a check is performed to determine whether the distance (dv) from the bounding object at the front is greater than or greater than or equal to a first threshold value in the oriented position, and, in this case, the vehicle heads toward the bounding object at the front in the forward direction under automatic control as part of the additional corrective move.

6. The method according to claim 5, wherein the vehicle heads toward the bounding object at the front in the forward direction as part of the additional corrective move until
the distance (dv) from the bounding object at the front reaches a second threshold value, provided that the distance (dh) from a bounding object at the rear meets a particular condition at the same time.

7. The method according to claim 6, wherein the vehicle heads toward the bounding object at the front in the forward direction as part of the additional corrective move after the distance (dv) from the bounding object at the front has dropped below the second threshold value,
until the distance (dv) from the bounding object at the front substantially corresponds to the distance (dh) from the bounding object at the rear.

8. The method according to claim 1, wherein in the oriented position, a check is performed to determine whether the distance (dv) from the bounding object at the front is less than or less than or equal to a prescribed third threshold value in the oriented position, and, in this case, the vehicle heads away from the bounding object at the front in the reverse direction under automatic control as part of the corrective move.

9. The method according to claim 8, wherein the vehicle heads away from the bounding object at the front in the reverse direction as part of the additional corrective move, until the distance (dv) from the bounding object at the front reaches a fourth threshold value.

10. The method according to claim 9, wherein the vehicle heads away from the bounding object at the front in the reverse direction as part of the corrective move, until the distance (dh) from the bounding object at the rear substantially corresponds to or is less than the distance (dv) from the bounding object at the front.

11. The method according to claim 5, wherein in the oriented position, a check is performed to determine whether the distance (dv) from the bounding object at the front is less than or less than or equal to a prescribed third threshold value in the oriented position, and, in this case, the vehicle heads away from the bounding object at the front in the reverse direction under automatic control as part of the corrective move.

12. The method according to claim 11, wherein if:
the distance (dv) from the bounding object at the front is less than or equal to or less than the prescribed first threshold value in the oriented position, and
additionally, the distance (dv) from the bounding object at the front is greater than or equal to or greater than the third threshold value,
then the vehicle heads away from the bounding object at the rear in the forward direction under automatic control as part of the additional corrective move, until the distance (dh) from the bounding object at the rear substantially corresponds to or is greater than the distance (dv) from the bounding object at the front, or no corrective move is performed.

13. The method according to claim 12, wherein if:
the distance (dv) from the bounding object at the front is less than or equal to or less than the prescribed first threshold value in the oriented position, and
additionally, the distance (dv) from the bounding object at the front is greater than or equal to or greater than the third threshold value, and
additionally, the distance (dh) from the bounding object at the rear is greater than or equal to or greater than a fifth threshold value,
then no corrective move is performed; and
if:
the distance (dv) from the bounding object at the front is less than or equal to or less than the prescribed first threshold value in the oriented position, and
additionally, the distance (dv) from the bounding object at the front is greater than or equal to or greater than the third threshold value, and
additionally, the distance (dh) from the bounding object at the rear is less than or less than or equal to the fifth threshold value,
then the vehicle heads away from the bounding object at the rear in the forward direction under automatic control as part of the additional corrective move, until the distance (dh) from the bounding object at the rear substantially corresponds to or is greater than the distance (dv) from the bounding object at the front.

14. A parking assistance system for performing an automated parking process for a motor vehicle in a parallel parking space, comprising:
a transverse guidance controller that automatically controls transverse movement of the vehicle; and
a longitudinal guidance controller that automatically controls longitudinal movement of the vehicle,
wherein the parking assistance system is configured to:
steer the vehicle in one or more moves into an oriented position in the parallel parking space in which the vehicle is oriented substantially parallel to a lateral boundary line of the parallel parking space in the longitudinal direction and is at an admissible distance from the lateral boundary line of the parallel parking space, and
determine a distance (dv) from the vehicle to a bounding object at the front of the parking space when the vehicle is in the oriented position and,
based on the determined distance, allow the vehicle to perform an additional corrective move in which the vehicle moves in the forward direction or the reverse direction under automatic control, wherein the additional corrective move corrects the distance (dv) of the vehicle to a prescribed target distance from the bounding object at the front.

* * * * *